(12) United States Patent
Chen

(10) Patent No.: US 7,188,947 B1
(45) Date of Patent: Mar. 13, 2007

(54) LENS COMBINED WITH A SOFT EYEGLASSES RIM

(76) Inventor: Chin-Jen Chen, No. 39-7, Liu Kuai Liao, Liu Chia Village, An Ting Hsiang, Tainan Hsien (TW)

( * ) Notice: Subject to any disclaimer, the term of this patent is extended or adjusted under 35 U.S.C. 154(b) by 0 days.

(21) Appl. No.: 11/385,839

(22) Filed: Mar. 22, 2006

(51) Int. Cl.
*G02C 1/00* (2006.01)
(52) U.S. Cl. .......................... 351/86; 351/83; 351/103; 351/106
(58) Field of Classification Search ................ 351/83, 351/86, 103, 106, 41, 156, 157, 158
See application file for complete search history.

(56) References Cited

U.S. PATENT DOCUMENTS 5,386,254 A * 1/1995 Kahaney ..................... 351/60
5,428,410 A * 6/1995 Lei .............................. 351/47
5,796,460 A * 8/1998 Maturaporn ................. 351/86
2005/0254001 A1* 11/2005 Winningham ............... 351/156

* cited by examiner

*Primary Examiner*—Hung Xuan Dang
(74) *Attorney, Agent, or Firm*—Rosenberg, Klein & Lee

(57) ABSTRACT

A lens combined with a soft eyeglasses rim includes a lens and a soft eyeglasses rim. The lens is provided with plural holes spaced apart near a circumference in advance, and then placed in a mold for making the soft eyeglasses. Then the soft eyeglasses rim is injected molded in the mold with the finished lens previously placed. Thus the soft eyeglasses rim is formed with plural projections corresponding to and fitting in the plural holes of the lens as fused to keep the rim with the lens in a stable and secured condition.

9 Claims, 6 Drawing Sheets

LENS COMBINED WITH A SOFT EYEGLASSES RIM

BACKGROUND OF THE INVENTION

1. Field of the Invention

This invention relates to a lens combined with a soft eyeglasses rim, particularly to one structured to easily combine stably with a soft eyeglasses rim.

2. Description of the Prior Art

In the modern days, people are liable to get shortsighted caused by looking at TV or computer screens for a long consecutive time. So eyeglasses have to be widely used for correction of shortsightedness.

Most eyeglasses are composed of two lenses, a rim, and two temples, with the lenses fitted in the annular groove of the rim and kept tightly with a fastening means such as screws engaging with threaded holes at an outer side of the rim. In the combining process of the lenses and the rim, the lenses have to be fitted closely in the annular inner groove of the rim and then two threaded holes of the rim are aligned to each other and then fastened tightly together with the screws. However, this kind of combining way takes a long time, not convenient or profitable for mass production.

A conventional eyeglasses shown in FIG. 1 includes a lens 31, and a rim 32 combined together with the lens 21 by means of fitting notches 311 formed spaced apart in an upper edge of the lens 31 fitted in by plural protrusions 321 formed on a lower edge of the rim 32. But the lens 31 and the rim 32 combined in this way are liable to separate from each other, lacking in solid tightness.

SUMMARY OF THE INVENTION

In view of the high cost of conventional eyeglasses, this invention has been devised to offer a lens combined with a soft eyeglasses rim with a simple structure to combine the lens and the eyeglasses rim tightly together, not separating from each other easily, and costing cheaply.

The feature of the invention is a finished lens placed in a mold for making an eyeglasses rim so that the lens may be combined with the eyeglasses rim as integral when the eyeglasses rim is made by injecting molding process. Further the lens is provided with plural holes near a circumferential edge for plural projections spaced apart near a circumferential edge of the rim to fit therein. And the holes of the lens and the projections of the eyeglasses rim are fitted together as fused stably in the course of the injecting molding process, hardly separating from each other.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of a lens combined with soft eyeglasses rim in the present invention, as shown in FIGS. 2–6, can be applied to protective eyeglasses, swim eyeglasses or wind eyeglasses, including a lens 1 previously made with plural holes 11 located spaced apart near its circumference, and a soft eyeglasses rim 2 formed in a mold, in which the finished lens 1 is placed before the soft eyeglasses rim 2 is made by injecting material in the mold with plural projections 21 formed to fit in the holes 11 of the lens 1. The soft eyeglasses rim is made of soft material such as foam material, foam rubber, silica gel, etc. Thus, the lens 1 is securely combined with the eyeglasses rim 2, with the projections 21 of the eyeglasses rim 2 almost fused in the holes 11 of the lens 1 in the injecting molding process.

Figure 1:
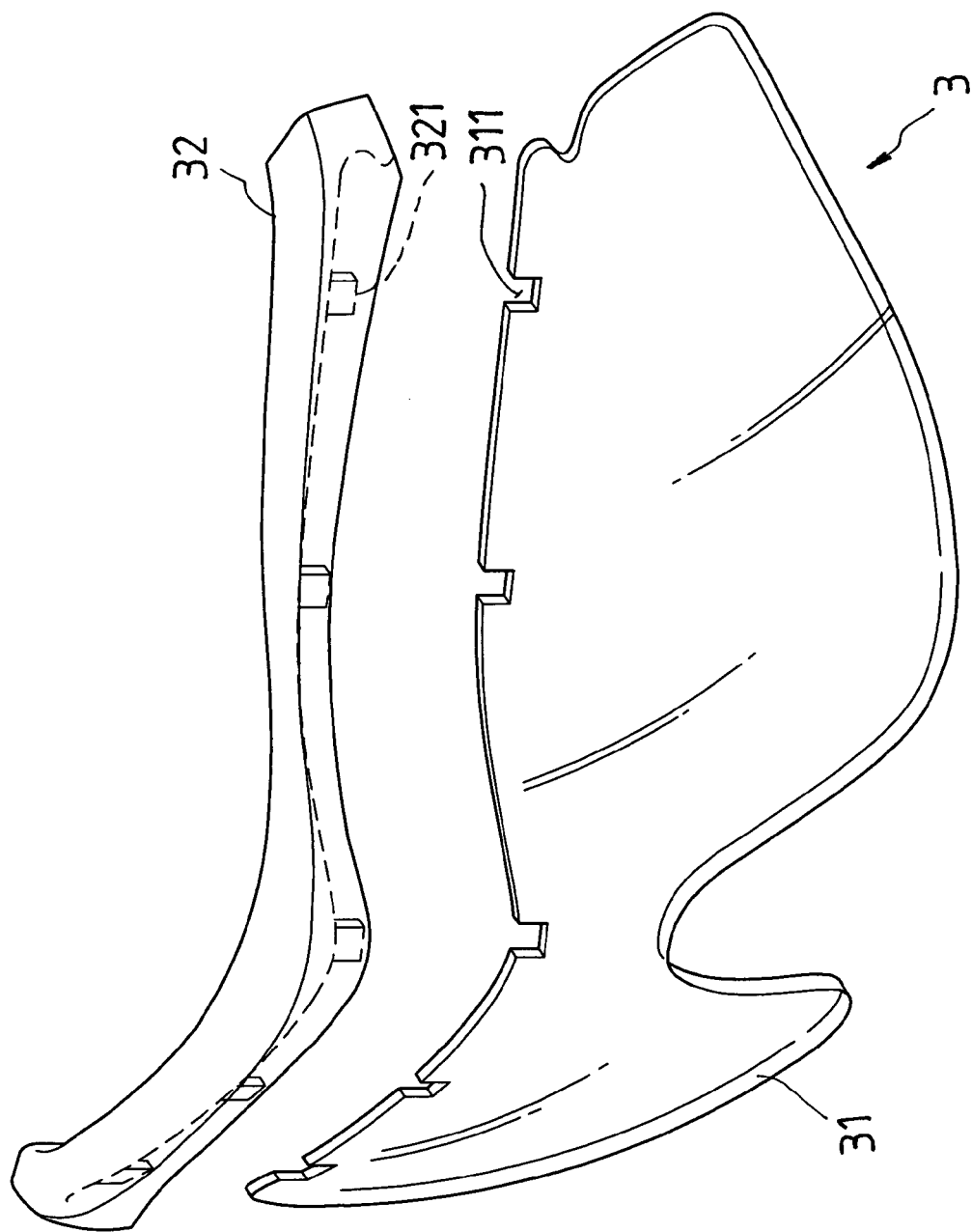
FIG. 1 is an exploded view of a conventional lens and a conventional eyeglasses rim.
Figure 2:
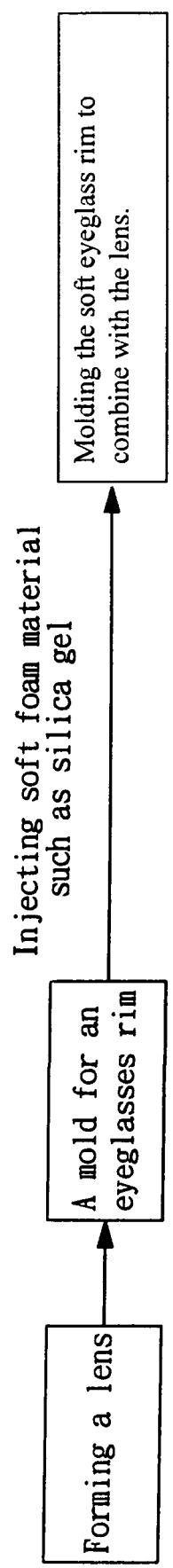
FIG. 2 is a block diagram of the combining process of a lens and an eyeglasses rim in the present invention.
Figure 3:
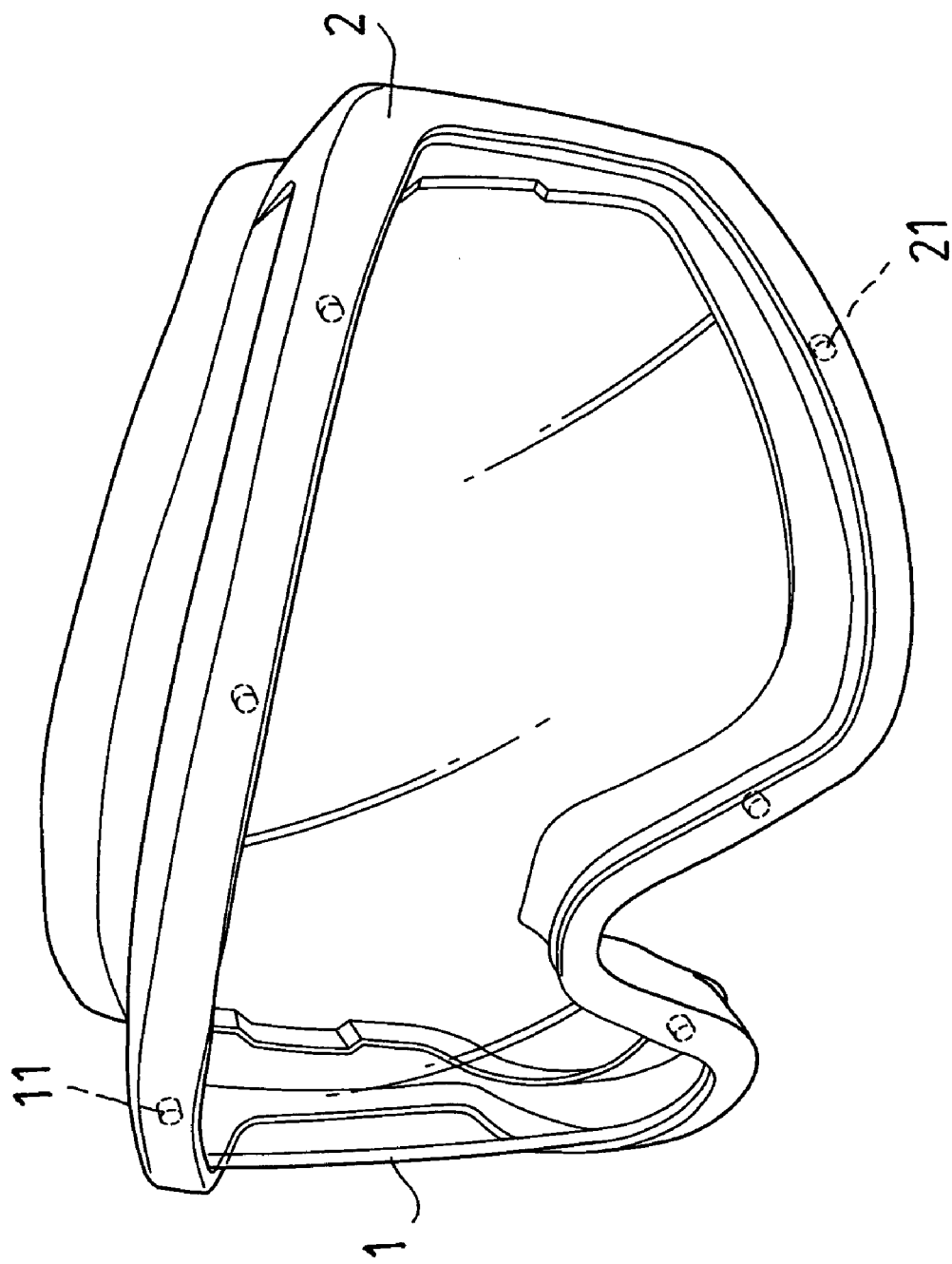
FIG. 3 is a perspective view of a first example of a lens combined with a soft eyeglasses rim in the present invention.
Figure 4:
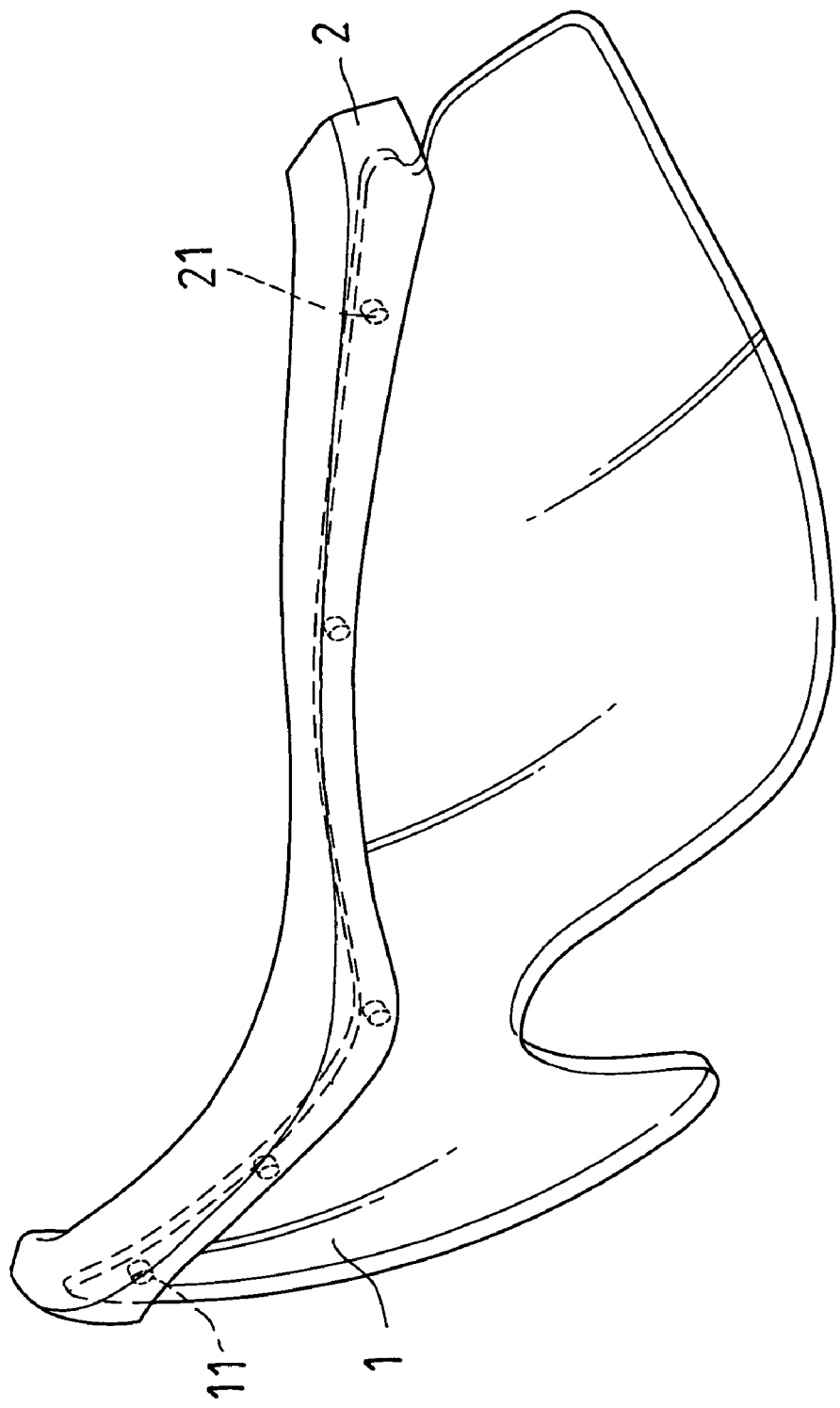
FIG. 4 is another perspective view a second example of lens combined with a soft eyeglasses rim in the present invention.
Figure 5:
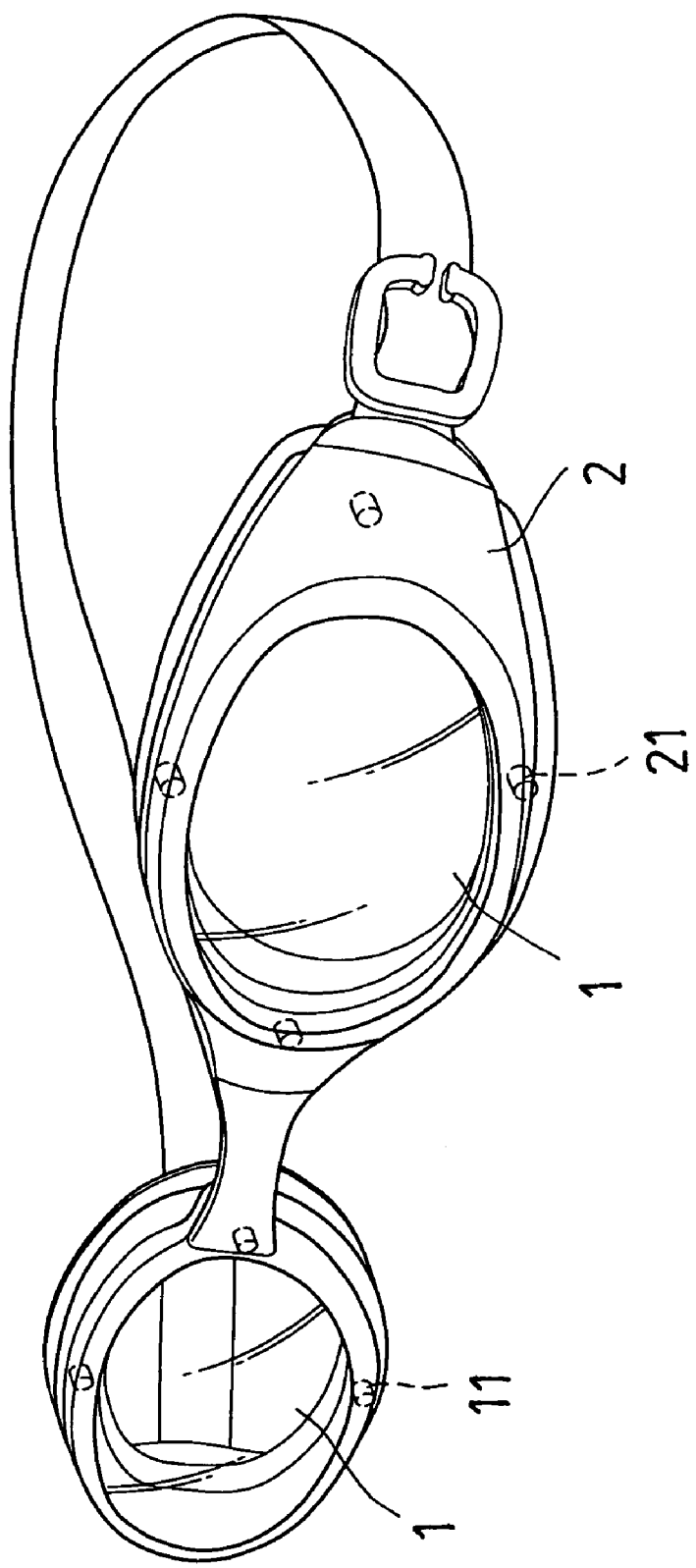
FIG. 5 is another perspective view of a third example of a lens combined with a soft eyeglasses rim in the present invention; and, FIG. 6 is a cross-sectional view of the lens combined with a soft eyeglasses rim in the present invention.
Figure 6:
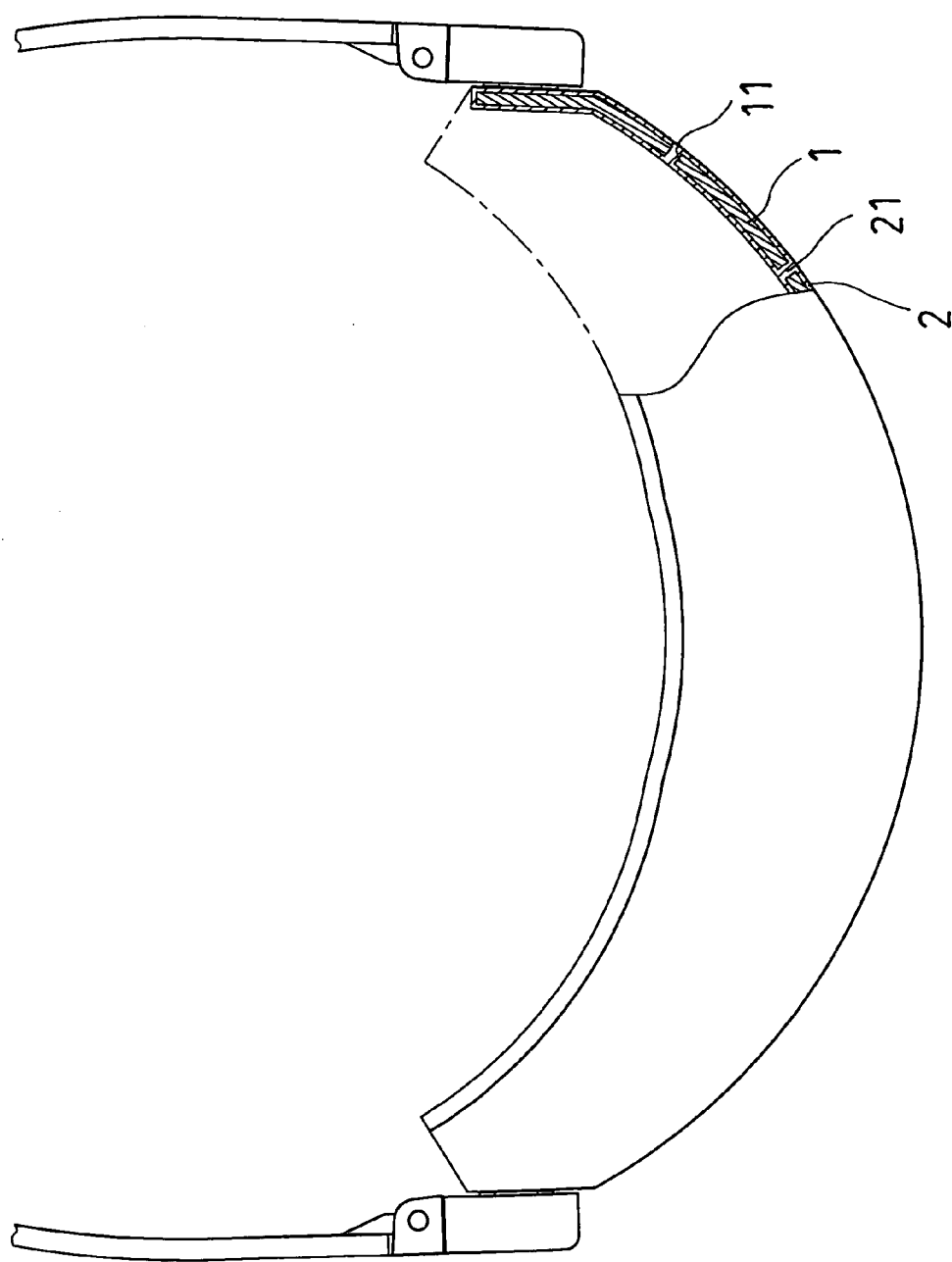

FIGS. 3, 4 and 5 show three different examples of a lens combined with a soft eyeglasses rim according to the way of the invention.

The invention has the following advantages, as can be understood from the foresaid description.

1. The eyeglasses rim in the invention is injected molded, with the finished lens beforehand placed in the mold of the eyeglasses rim, largely cutting down the cost, if comparing to the method of combining a conventional lens with a conventional eyeglasses rim requiring screws to engage the conventional eyeglasses rim and provision of an annular inner groove of the rim for the conventional lens to fit therein.
2. The lens in the invention is in advance provided with plural holes spaced apart near its circumference, and the holes are fitted in almost as fused by the projections of the eyeglasses rim during the injecting molding process, making the combination of the lens and the eyeglasses stable and secured.
3. The eyeglasses rim is made of foam material, foam rubber, silica gel, etc, so a wearer may feel comfortable.

While the preferred embodiment of the invention has been described above, it will be recognized and understood that various modifications may be made therein and the appended claims are intended to cover all such modifications that may fall within the spirit and scope of the invention.

What is claimed is:

1. A protective eyewear system comprising:
   (a) a lens element having a plurality of lens through openings, said lens through openings positioned adjacent a circumference of said lens element; and
   (b) a soft eyeglass rim element having a plurality of projections corresponding to said lens through openings, said respective plurality of projections being fixedly secured to an inner wall of respective ones of said lens through openings, said projections being fused to said inner walls of said lens through openings.

2. The protective eyewear system as claimed in claim 1, wherein said soft eyeglass rim is made of foam material.

3. The protective eyewear system as claimed in claim 1, wherein said soft eyeglass rim is made of foam rubber.

4. The protective eyewear system as claimed in claim 1, wherein said soft eyeglass rim is made of silica gel.

5. A method for making eyeglasses comprising:
   (a) forming a lens having a plurality of through-openings adjacent a circumference of said lens;

(b) inserting said lens in a mold; and
(c) injecting a material into the mold whereby said material flows through said plurality of through holes and contiguous at least a portion of a peripheral edge of said lens forming a soft eyeglass rim integrally affixed and stably fused to said lens.

6. The method for making eyeglasses as claimed in claim 5, wherein said soft eyeglass rim is made of foam material.

7. The method for making eyeglasses as claimed in claim 5, wherein said soft eyeglass rim is made of foam rubber.

8. The method for making eyeglasses as claimed in claim 5, wherein said soft eyeglasses rim is made of silica gel.

9. The eyeglasses as made by the process defined in claim 5.

* * * * *